Jan. 28, 1969 L. F. BENDER 3,424,098
DUMP VALVE FOR FLUID CONVEYING APPARATUS
Filed Jan. 12, 1967
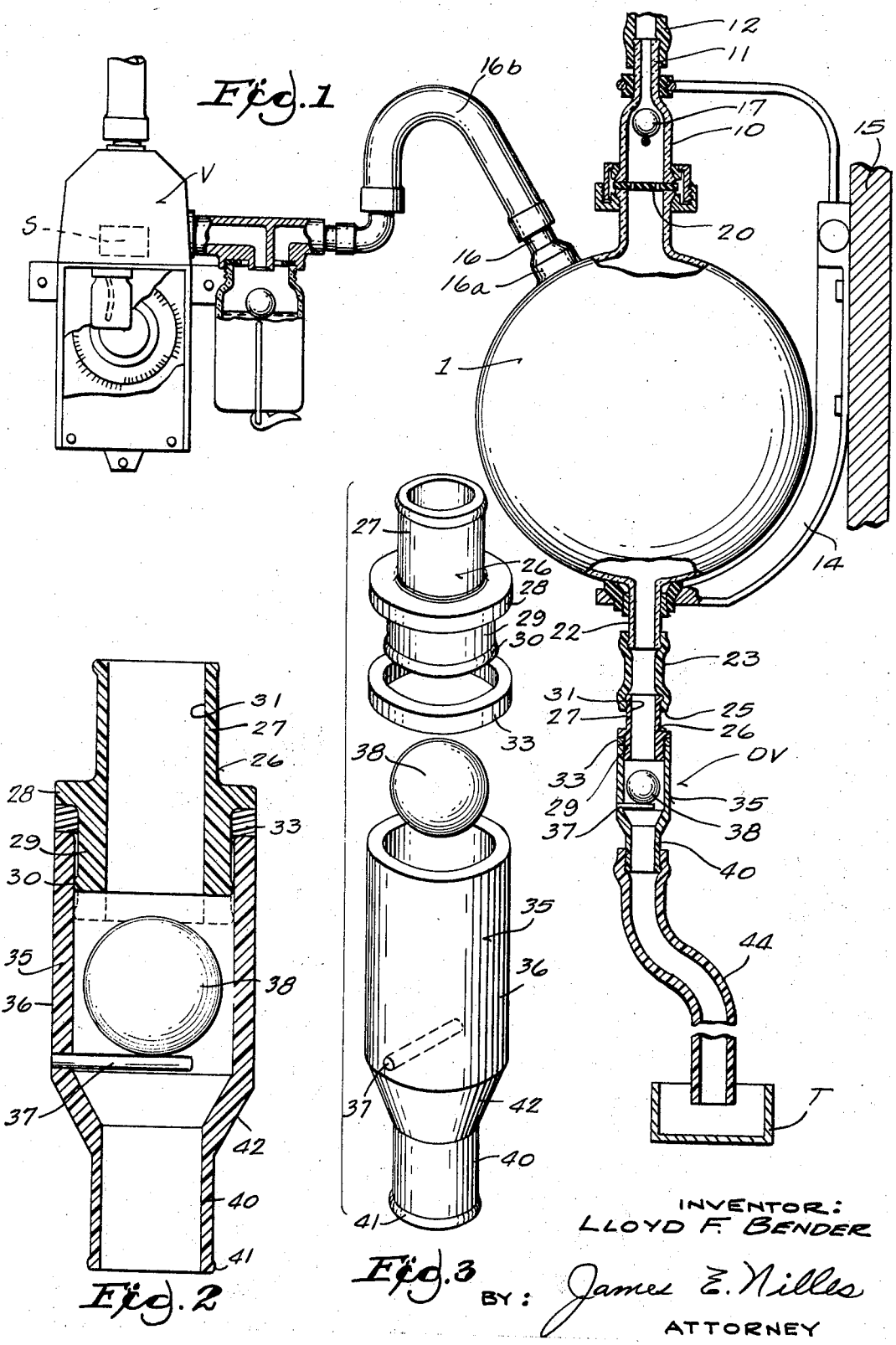
INVENTOR:
LLOYD F. BENDER
BY: James E. Nilles
ATTORNEY

United States Patent Office 3,424,098
Patented Jan. 28, 1969

3,424,098
DUMP VALVE FOR FLUID CONVEYING APPARATUS
Lloyd F. Bender, Hayward, Wis. 54843
Filed Jan. 12, 1967, Ser. No. 608,892
U.S. Cl. 103—228
Int. Cl. F04b *21/02;* F04f *3/00;* F16k *15/04*
4 Claims

ABSTRACT OF THE DISCLOSURE

Fluid handling equipment of the clean-in-place type used in the dairy industry, including a fluid releaser having a dump valve. The valve has a removable capacity ring for varying the throw of the valve check ball to thereby accommodate liquid releasers of different vacuum capacities.

Background of the invention

This invention pertains to fluid handling equipment for dairy industry or the like which is cleaned-in-place and is in the nature of an improvement over the dump valves shown in my U.S. Patents: 3,273,514, issued Sept. 20, 1966; 3,191,576, issued June 29, 1965; 3,116,714, of Jan. 7, 1965; or 2,897,828, of Aug. 4, 1959.

While the dump valves of the above mentioned patents performed satisfactorily under most conditions, they had certain shortcomings, among which was the inability to close properly and at the correct time for all vacuum capacities of the releaser or different types of releasers.

Summary

The present invention provides an improved dump valve for a fluid releaser used in clean-in-place equipment for the dairy industry.

More specifically, the present invention provides a dump valve of the above type which is positive in seating and operation, fast in its action, and capable of use in releasers having either a maximum flow and vicious vacuum or one not capable of full capacity vacuum. In addition, the improved valve seats squarly on a rigid seat, is economical to manufacture, and is easily assembled and disassembled in a foolproof manner.

These and other objects and advantages will appear hereinafter as this disclosure progresses, reference being had to the accompanying drawings.

Brief description of the drawings

FIGURE 1 is an elevational view of a fluid conveying apparatus made in accordance with the present invention, certain parts being shown as broken away and in section for clarity;

FIGURE 2 is an enlarged, fragmentary, sectional view of the check valve apparatus shown in FIGURE 1, and FIGURE 3 is a perspective, exploded view of the dump valve shown in FIGURE 1 on an enlarged scale.

Description of the preferred embodiment

Referring in greater detail to the drawings, the fluid vessel 1 is spherical in shape and is made of transparent material such as glass which contributes to insuring cleanliness.

A fluid inlet conduit 10 is located at the upper side of the vessel and is made separable to permit assembly of the parts and facilitate cleaning, inspection and repair. The uppermost end 11 of the conduit is of reduced diameter, and receives the fluid supply conduit 12. Fluid is thus delivered to the vessel from any source, such as a conventional milk line in a barn or a tank of fluid.

A suitable bracket 14 secures the vessel at any desired height to a building member 15, and the vessel rests on the lower end of the bracket and is held as taught in my U.S. Patent No. 3,186,428 which issued on June 1, 1965.

A vacuum conduit 16 is formed integrally in the top of the vessel and extends at an incline therefrom. An enlarged portion 16a prevents fluid from being sucked into the attached vacuum conduit 16b as taught in my co-pending U.S. application Ser. No. 443,055 filed Mar. 26, 1965, and entitled "Milk Line Equipment" and reference may be had to that application if a more complete explanation of the position and shape of the vacuum inlet is thought to be either necessary or desirable.

Means are provided for alternately subjecting the vessel 1 to vacuum to thereby draw fluid through inlet conduit 12 to fill the vessel, and then subjecting the vessel to atmospheric pressure to cause the fluid to dump via valve DV into the tank T. This means includes a slide valve V, and if further reference to it is deemed desirable, reference may be had to said U.S. Patent 3,191,576 issued June 29, 1965.

When the vessel is substantially full, the timer then causes a solenoid S to shift the valve, thus placing the vessel under atmospheric pressure. This immediately permits dump valve DV (to be referred to later) to open and dump fluid. At the same time ball 17 rises and immediately closes off conduit 12. The function of the ball 17 is described in my co-pending U.S. application Ser. No. 558,703, filed June 20, 1966, and reference may be had to that application if a full description of the inlet means is desired. It is believed sufficient to say here, that the rising of the ball 17 is facilitated and insured by the washer 20 which causes the formation of a pool of fluid in the upper portion of inlet conduit 10 resulting in a sufficient floating action of ball 17 to permit it to immediately be drawn up to block conduit 12. The apertured washer retards the downward flow of fluid sufficiently to permit it to build up slightly above the washer and lets the ball 17 go up quickly to check the return flow back through the conduit 12.

The vessel has an integrally formed fluid discharge nipple 22 at its lower end to which is attached a plastic, thick walled, flexible conduit 23. Conduit 23 has the one-way valve DV, previously referred to, at its lower end and located closely adjacent the vessel. The end 25 of the conduit 23 is cut square, that is, the end 25 is cut at 90 degrees to the axis of the conduit.

Dump valve

In accordance with the present invention, the dump valve DV comprises an insert 26 which has a reduced upper, generally cylindrical end 27 inserted in the end of conduit 23 and forms a tight, sealing fit therewith. This insert also has a radial flange 28 and a lower, cylindrical portion 29 of reduced diameter. The lower end of portion 29 has an enlargement in the form of an annular rim 30 around its periphery. The bore 31 through the inlet is uniform and the same size as the interval diameter of conduit 23. The flexible plastic conduit 23 is stretched or expanded in receiving the rigid insert 26 which is formed of hard nylon.

A spacer ring 33 formed of hard nylon, is located around portion 29 of the insert for a purpose that will appear.

A valve housing 35, also of hard nylon, has an enlarged, cylindrical portion 36 into the lower portion of which protrudes a stop pin 37 on which a check ball 38 is adapted to rest when the valve is open. The lower end 40 of the housing is of reduced cylindrical form and terminates in a rim 41 around the lower, outer side of portion 40. A downwardly converging taper portion 42 connects portions 36 and 40 together. Thus, the central portion of the housing is formed with a straight wall, that is, as a cylinder. Then the diameter reduces abruptly and the remaining portion is again cylindrical.

The check ball 38 is of relatively soft plastic which can seat tightly against the lower end of portion 29 of the insert, which lower end is formed normal or square to the longitudinal axis of the insert. When the vessel is subjected to vacuum, the ball seals against the insert, and when the vessel is subjected to atmosphere, the ball drops against the stop pin 37.

Another flexible conduit 44 is attached to the lower end of housing portion 40 for conducting fluid to a tank T. This flexible conduit 44 may be of considerable length and may sag or be relatively low during certain portions of its length. Nevertheless, the check valve will function properly and prevent fluid from being drawn back into the vessel from conduit 44 because the valve is located adjacent the lower end of the vessel.

The diameter of the ball, compared to the internal diameter of cylindrical portion 36, is such that fluid can flow freely therebetween.

The housing can accommodate vessels having different capacities and consequently different suction pressures at which the ball will close the valve. Generally, the larger vessel will require a longer stroke or travel of the ball in order to close the valve. This adjustable position of the valve can be readily selected.

When the present invention is used with a releaser having maximum flow and the vacuum is high, the spacer ring 33 keeps the upper end of the housing a distance away from the flange 28 of the insert and consequently creates a greater travel for the ball from the pin 37 to the ball seat against the insert, than if no spacer is used.

In other words, if a releaser is used that is of the restricted vacuum type, such as is shown in said Patent 2,897,828, then a shorter travel of the ball from the pin to its seat is desired, and ring 33 would be omitted to permit the housing to seat tightly against flange 28. The dotted line in FIGURE 2 shows the position of the valve seat when ring 33 is not used.

Various modes of carrying out the invention are contemplated as being within the scope of the following claims particularly pointing out and distinctly claiming the subject matter which is regarded as the invention:

1. In fluid conveying apparatus of the type having a vessel, a fluid inlet conduit and a fluid outlet flexible conduit for said vessel with a lower end of said outlet conduit terminating below said vessel, means for subjecting said vessel alternately to vacuum and atmosphere, the improvement comprising: a dump valve having an insert connectible with said lower end of said outlet conduit and defining a check ball seat at its lower end, a hollow housing slidably connectible to said insert and having a check ball stop means therein and spaced from said seat, a check ball in said housing for travel between positions against said stop means and seat, and a removable spacer ring between said insert and housing, whereby when said vessel is subjected to vacuum, said ball is sucked tightly against said seat for sealing engagement therewith, and when said vessel is subjected to atmospheric pressure said ball drops away from said conduit end and against said stop means to permit dumping of fluid from said vessel.

2. Apparatus as defined in claim 1 further characterized in that said insert has a radial flange and a lower end of reduced diameter, said lower end is located in said housing, and said spacer ring is located between and abuts against said flange and said housing.

3. Apparatus as defined in claim 1 further characterized in that said housing includes a cylindrical portion in which said ball travels, a lower cylindrical portion of reduced diameter, and a downwardly converging portion connecting said cylindrical portions.

4. Apparatus as defined in claim 2 further characterized in that said housing includes a cylindrical portion in which said ball travels, a lower cylindrical portion of reduced diameter, and a downwardly converging portion connecting said cylindrical portions.

References Cited

UNITED STATES PATENTS 3,273,514   9/1966   Bender _____ 103—236

FOREIGN PATENTS 444,346   3/1936   Great Britain.

ROBERT M. WALKER, *Primary Examiner.*

U.S. Cl. X.R.

103—236; 137—533.11